(12) United States Patent
Frank et al.

(10) Patent No.: US 7,392,429 B2
(45) Date of Patent: Jun. 24, 2008

(54) SYSTEM AND METHOD FOR MAINTAINING PERSISTENT STATE DATA

(75) Inventors: Alexander Frank, Bellevue, WA (US); Mark C. Light, Redmond, WA (US); William J. Westerinen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 519 days.

(21) Appl. No.: 11/020,329

(22) Filed: Dec. 22, 2004

(65) Prior Publication Data

US 2006/0139069 A1 Jun. 29, 2006

(51) Int. Cl.
G06F 11/00 (2006.01)
(52) U.S. Cl. .......................... 714/24; 714/22
(58) Field of Classification Search ............ 714/14, 714/22, 24, 5–6, 13; 713/300, 340
See application file for complete search history.

(56) References Cited

U.S. PATENT DOCUMENTS

| | | | | |
|---|---|---|---|---|
| 4,959,774 A | * | 9/1990 | Davis | 714/6 |
| 5,414,861 A | * | 5/1995 | Horning | 365/229 |
| 6,631,478 B1 | * | 10/2003 | Wang et al. | 714/15 |
| 2004/0039960 A1 | * | 2/2004 | Kassayan | 714/14 |
| 2005/0120251 A1 | * | 6/2005 | Fukumori | 713/300 |
| 2005/0132150 A1 | * | 6/2005 | Jewell et al. | 711/154 |

OTHER PUBLICATIONS

Specification as filed for U.S. Appl. No. 10/837,986, filed May 3, 2004 entitled "Non-Volatile Memory Cache Performance Improvement,".
Specification as filed for U.S. Appl. No. 10/949,154, filed Sep. 24, 2004 entitled "Method and System for Improved Reliability in Storage Devices,".

* cited by examiner

*Primary Examiner*—Dieu-Minh Le
(74) *Attorney, Agent, or Firm*—Marshall, Gerstein & Borun LLP

(57) ABSTRACT

A system and method for maintaining persistent data during an unexpected power loss uses a memory controller and a supplemental power source. An entity running on the computer, for example, an application program, a utility, the operating system or other entity, may identify data for preservation using an application program interface. The application program interface may be provided by the memory controller. A sensor determines when an unexpected power loss has occurred and signals the memory controller. Using power from the supplemental power source, i.e. a battery or capacitor, the memory controller copies the identified data to a non-volatile memory. The memory controller may set a flag to indicate that preserved data is available for later recovery.

19 Claims, 5 Drawing Sheets

US 7,392,429 B2

SYSTEM AND METHOD FOR MAINTAINING PERSISTENT STATE DATA

BACKGROUND

The notion of backing up critical data on a computer is known. Application programs, such as word processors, can be programmed to periodically make a backup copy of work-in-progress to a non-volatile memory. However, when power is lost, those edits between the last backup and the power loss are not recoverable. In most cases, the value of the data lost is not significant enough to take further measures to store the incremental information.

In circumstances where the value of the incremental data is high, or when accessibility is critical, other measures can be taken. For example, the computer can be run with a battery backup, such as an uninterruptible power supply (UPS). However, the purchase price and maintenance costs associated with a UPS make it impractical for most users and may still not be effective against deliberate attempts to interrupt power to the computer for the purpose of intentionally corrupting usage or tracking data.

One business model for delivering computers into emerging markets involves subsidizing the initial cost of a computer and recouping the investment by charging incrementally for the use of the computer, for example, by a subscription agreement or per-use using funds from a pre-paid account. It may be important to both a service provider supplying the computer and end-users that correct state data regarding use is accurately maintained on the computer, especially during a power loss. The loss of usage metric and/or other state data in a power outage may result in under or over counting. Under counting a usage metric may injure the service provider by not counting all uses. Over counting the usage metric may be to the detriment of end-users since they will not get full use of the computer they are entitled to. It becomes desirable to take steps to minimize loss of usage metric or other critical data associated with use of the computer without adding the undue cost and maintenance associated with an uninterruptible power supply.

SUMMARY

A computer is adapted to store critical information after the computer becomes aware of a power loss, such as an unexpected power loss or non-graceful power off. The computer may have an auxiliary or supplemental power source that is capable of powering a specialized memory controller and a portion of memory long enough to write-out usage and other critical state data, for example, to a special, non-volatile memory. Alternately, the supplemental power source may maintain power to the main processor long enough to execute a software handler to copy usage and other critical data to a special, non-volatile, memory. Particularly in the former configuration, the memory controller may be accessible by an application program interface (API) used by the operating system, an application, or metering program to designate locations of memory that need to be saved by the memory controller during an unexpected power loss. In yet another embodiment, the memory locations of data to be automatically backed up may be hard-coded, such that any data written to those locations are transferred to non-volatile memory when power is lost.

The memory controller may have one or more flag locations that can be used to indicate that an unexpected power loss occurred or to indicate that data was copied to the designated non-volatile memory or both. Read access to the flags and the stored data may also be made through the API.

A sensor may be used to monitor the power for alerting system components, such as the memory controller, that the power has been lost unexpectedly. The sensor may be part of the power supply or may be a separate circuit. (i.e. the sensor may be before or after power supply, i.e. senses power failure or power failure/power supply failure.) When the sensor alerts the system components, for example, the memory controller, that the line power has been lost, the memory controller may refer to information programmed via the API to extract critical data from the main memory and transfer it to the special non-volatile memory for storage until the main power and normal operation of the computer is restored. The data stored may be sensitive and, as such, may be encrypted or may require encryption to ensure a reliable copy is restored.

DETAILED DESCRIPTION OF VARIOUS EMBODIMENTS

Figure 1:
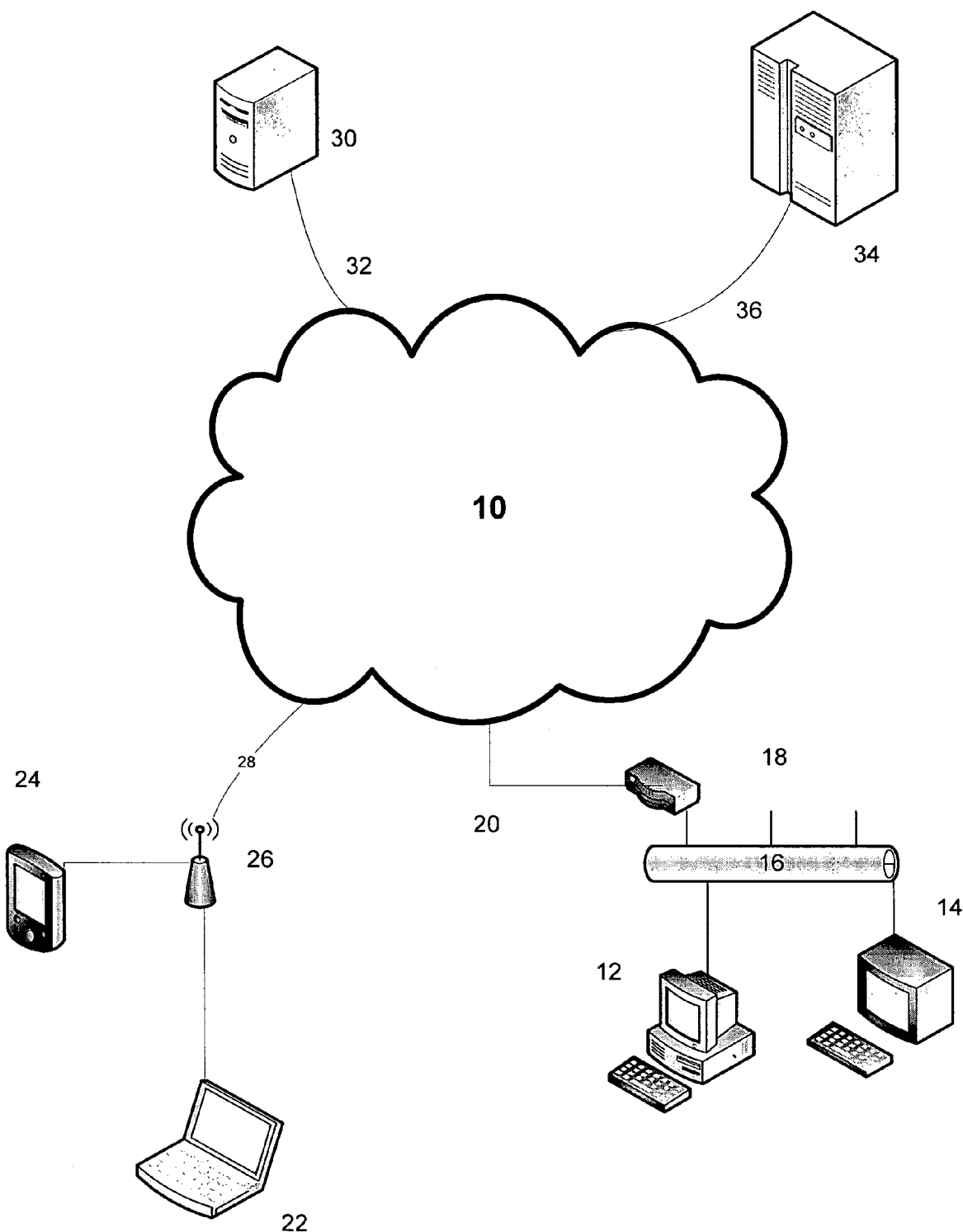
FIG. 1 is a simplified and representative block diagram of a computer network.

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . % " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Many prior art high-value computers, personal digital assistants, organizers and the like may not suitable for use in a pre-pay or pay-for-use business model without additional precautions for protecting critical data. As discussed above, such equipment may have significant functions apart from those requiring a service provider. For example, a personal computer can be disconnected from a provided Internet service and still be useful for word processing, spreadsheets, etc. In the case where an Internet service provider underwrites the cost of the personal computer with the expectation of future fees, this "untethered value" creates an opportunity for fraudulent applications and theft. Pre-pay business models, where a user pays in advance for use of a subsidized, high value computing system environment have similar risks of fraud and theft.

FIG. 1 illustrates a network 10 that may be used to implement a dynamic software provisioning system. The network 10 may be the Internet, a virtual private network (VPN), or any other network that allows one or more computers, communication devices, databases, etc., to be communicatively connected to each other. The network 10 may be connected to a personal computer 12 and a computer terminal 14 via an Ethernet connection 16, a router 18, and a landline 20. On the other hand, the network 10 may be wirelessly connected to a laptop computer 22 and a personal digital assistant 24 via a wireless communication station 26 and a wireless link 28. Similarly, a server 30 may be connected to the network 10 using a communication link 32 and a mainframe 34 may be connected to the network 10 using another communication link 36.

Figure 2:
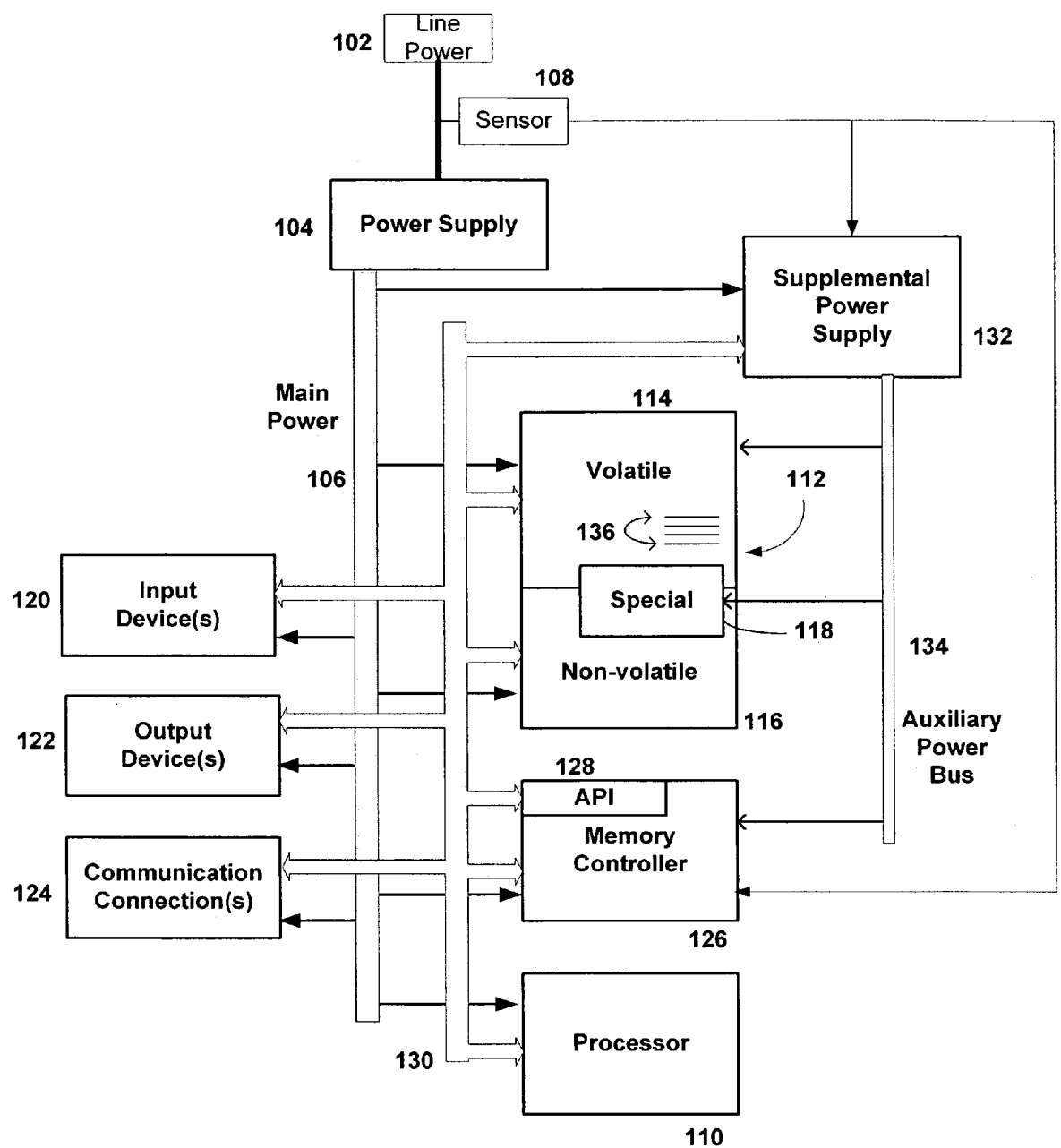
FIG. 2 is a block diagram of a computer that may be connected to the network of FIG. 1.

FIG. 2 illustrates a representative computer 100. The computer 100 may be the same or similar to any of the computing devices of FIG. 1, for example, personal computer 12, laptop computer 22 or personal digital assistant 24. The computer 100 may be powered via a line power connection 102. While the term line power is used herein, it should be understood than the line power connection 102 may be coupled to any source of power, such as conditioned lines, generators, battery backed power, direct current bus feeds, etc. Power from the line power connection 102 may be fed to a power supply 104 for supplying power to the rest of the computer's components via power bus 106. A sensor 108 may be used to determine when power from the line power connection 102 is present, or perhaps more importantly, when power from the line power connection 102 is reduced or disappears completely in a sudden power loss. A sudden power loss may be differentiated from an expected power loss simply by whether the operating system is aware of the change in power status and has time to perform an orderly shutdown and save system variables in a normal fashion.

The computer 100 may also have a processor 110. The processor 110 may be any. processor, for example, x86, PowerPC™, MIPS™, etc. Such processors are known in the art and readily available.

Memory 112 or computer storage media may include volatile memory 114 and nonvolatile memory 116. Non-volatile memory 116 may include removable and non-removable media implemented in any method or technology for storage of information such. as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. A special memory 118 may be built using either volatile or non-volatile memory. The special memory 118 may have separate power connections to the supplemental power source 132 to allow operation after main power is lost. Further, the special memory 118 may be a non-volatile memory such as an electrically erasable programmable read-only memory (EEPROM) or may be a volatile memory with its own or a separate energy source, such as a battery for long-term maintenance of the data stored therein. The function of the special memory is discussed in more detail below.

The computer 100 may typically have input devices 120, such as keyboard or mouse (not depicted), and output devices 122, such as a monitor or screen (not depicted). The computer 100 may typically also have communication connections 124 for exchanging communication media with external entities. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media.

The computer 100 may include a memory controller 126 for resolving internal and external addressing and may also include capability for managing virtual memory, disk caching and other known memory management techniques. A memory interface application program interface (API) 128 may be used to interface with special capabilities of the memory controller 126. The memory controller 126 may maintain a mapping of virtual to physical memory, such that data written to specific virtual addresses are always written to physical memory that will be backed up during an unexpected power loss. Alternatively, an application may designate data to be backed up and the memory controller may maintain the data to be backed up in an area of physical memory that will maintain at least temporary power after an unexpected power loss. The memory interface API 128 and the special capabilities of the memory controller 126 are discussed in more detail below.

The system bus 130 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect. (PCI) bus also known as Mezzanine bus.

The supplemental power source 132 may be present in the computer 100. The supplemental power source 132 may supply power to the computer 100 via an auxiliary power bus 134. The supplemental power source 132 may contain a source of energy, such as a battery or super capacitor, capable of powering at least a portion of memory 112 or special memory 118 and memory controller 126.

In operation, a program, such as an application program, the operating system, or a utility, may use an application program interface 128 to designate data, illustrated by data 136, to be preserved in the event of a sudden or unexpected power loss. The data 136 may be designated by its location in physical memory, by a logical address, by a pointer to a structure, or any other suitable mechanism. The data may be related to operation of the computer in a pay-per-use fashion, i.e., metering data, or may be system variable information. The data 136 may be critical, that is, the data 136 is required for correct operation or for preserving the integrity of value-based operations. Alternatively, the data 136 may just be useful for time savings when re-booting from the sudden power loss.

In an exemplary embodiment, the application program interface 128 may include the following commands:

AddMemoryObj([in]MemoryRange) adds a memory range to be preserved upon power loss. In some embodiments, multiple ranges may be designated.

GetFlags([out]PowerLost, [out]DataPreserved)

ResetFlags( ) clears the flags after restoration of data or recovery boot

Disable( ) disables the system. For instance, it should be used in a graceful shutdown, after the data was properly persisted, to avoid a false alarm or a race. Additionally, this call may purge all the memory ranges added thus far. Alternately, a special API that resets the lists of protected memory ranges may be added.

Enable( )—Turns the system on. One could argue that this API isn't needed. Adding the first memory object (above) also enables the system.

The information used to designate the data 136, or meta-data about the data 136 may be stored in the memory controller 126 or another suitable memory. The meta-data may be stored in a non-volatile memory location for ease of retrieval at a future time. However, the API 128 may ultimately control where the meta-data is finally stored and if the meta-data is retained after a sudden or unexpected power loss.

When a signal is received indicating a sudden power loss is under way, the supplemental power source 132 may react to supply power to the auxiliary power bus 134. In an alternate embodiment, the supplemental power source 132 may continuously supply power to the auxiliary power bus 134 in order to better ensure a smooth transition between main and supplemental power. To avoid leakage of supplemental power to the rest of the computer, the devices on the auxiliary power bus 134 may be connected only to the auxiliary power bus 134. In yet another embodiment, the auxiliary power bus 134 and the main power bus 106 may be the same or coupled. Switches or tri-state devices may be used to isolate any devices not related to data 136 preservation.

When the memory controller 126 receives the signal from the sensor 108 that power has been lost, the memory controller 126 may use the meta-data about the data 136 to identify and access memory location indicated by the meta-data. The data 136 may then be copied to a special non-volatile memory 118. When the data 136 has been copied, the memory controller 126 may set a flag indicating the data 136 has been copied. When the memory controller 126 has cryptographic services available, the memory controller may be able to encrypt data during the storage process. By doing so, the data so preserved may be less susceptible to attack or other tampering. This may be the case when the data relates to financial transactions such as metering information when the computer is configured for pay-per-use operation. The API may allow each requesting service to select encryption or not. Key generation and storage may require additional circuitry (not depicted) that may also need supplemental power during the unexpected power loss.

It may not be cost effective to store enough energy in the supplement power source 132 to operate the-computer 100, or even to operate the computer 100 through a shut-down sequence, therefore the supplemental power source 132 may supply power only to the components participating in the storage of the data 136. That is, at a minimum, the memory controller 126, the memory 114 containing the data 136 and the special memory 118 may be powered by the supplemental power source 132, and then only temporarily. By powering only a subset of the components of the computer 100, the supplemental power source 132 may be kept small and cost effective. To minimize the power burden on the supplemental power source 132, power to individual components may be sequenced off according to their appetite for power, i.e. the processor 110 may be powered off first.

When the computer 100 has power restored and the system recovers/reboots, the applications, operating system or utilities that preserved data using the memory controller 126 may use the API 128 to recover the preserved data. For example, an application that preserved data may first check the API for a flag indicating that data associated with the application is available for recovery. When data is available the application may use the API to recover the data. The application may be responsible for restoring the data to an appropriate memory location. When the data has been recovered, and optionally acknowledged by the requesting application, the API 128 may clear the flag and free any memory associated with the stored data. In an alternative embodiment, memory may be configured in a cyclic fashion to allow data to persist until overwritten by newest data.

Figure 3:
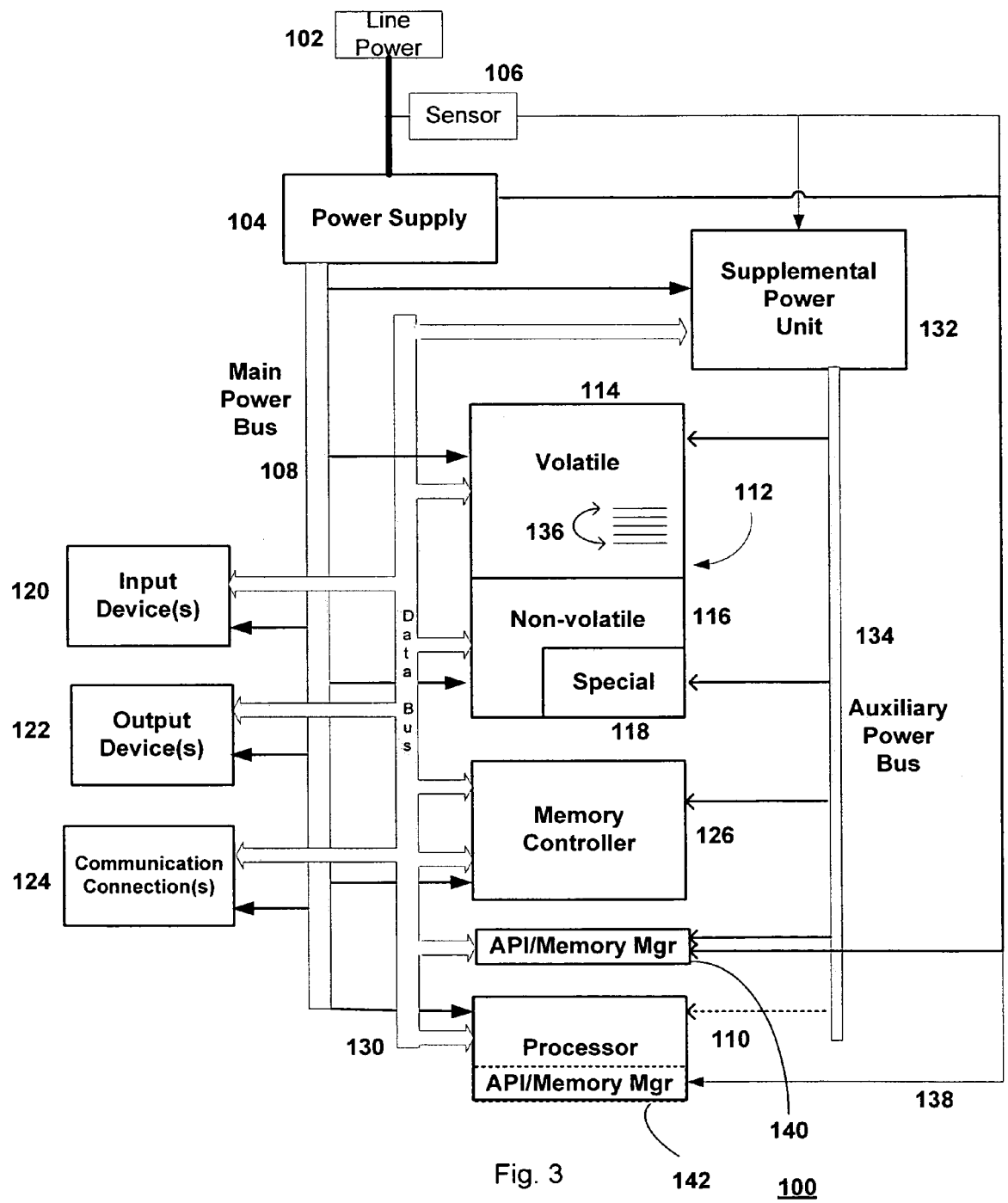
FIG. 3 is a block diagram of an alternate configuration of the computer of FIG. 2.

As shown in FIG. 3, the functions of the memory controller 126 associated with the API interface 128 and post-power loss data preservation may be performed by a separate, dedicated, circuit 140. Alternatively, those functions may be implemented in software or integrated on the processor chip itself or fabricated as a multi-chip module (MCM), as depicted by block 142. When integrated with the processor, the supplemental power source 132 may be connected to the processor 110.

Figure 4:
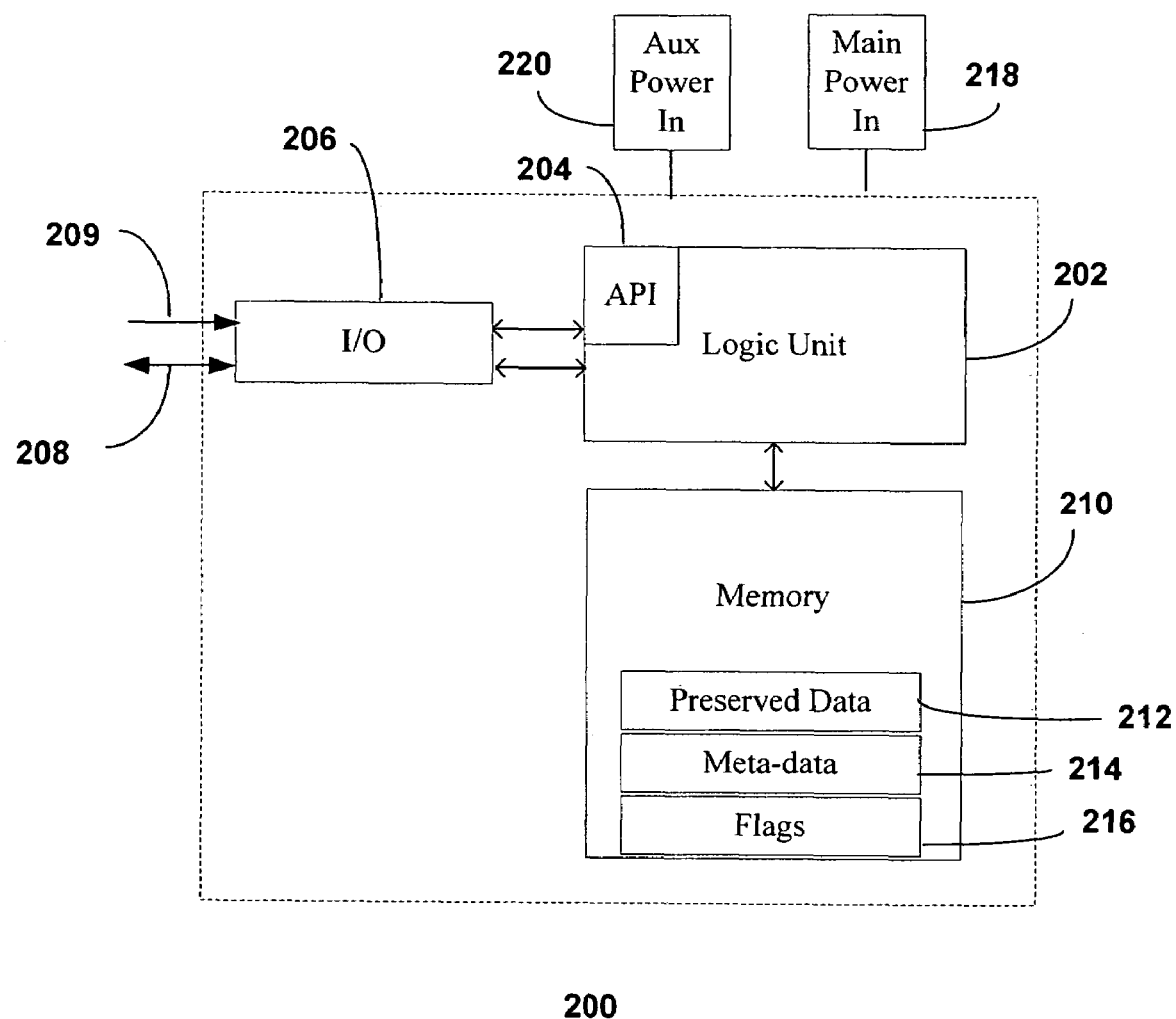
FIG. 4 is a block diagram of a memory controller for use with the computer of FIG. 2.

FIG. 4, a representative block diagram of a memory controller for use in a computer adapted for maintaining persistent data during an unexpected power loss. The memory controller 200 may have a logic unit 202. The logic unit 202 may implement the functions of the application program interface (API) 204. The logic unit may receive data via the input/output circuit 206 over signal connections 208 209. The data may include instructions for the API 204 or data or preservation/restoration, for example data 136 of FIG. 3, using port 208. The data may also include a signal from the sensor 108 indicating an unexpected power loss.

The memory controller 200 may also include a memory 210. The memory may be or include both volatile and non-volatile memory, including, in one embodiment, locations for preserved data 212 or pointers to preserved data, meta-data 214 about preserved data and/or data to be preserved, and flag information 216 to indicate an unexpected power loss and/or the presence of preserved data.

In an alternate embodiment, the memory controller 200 may be configured to map certain logical addresses to a fixed area of physical memory. This may help ensure that data written by an application to given logical address will be written to a portion of physical memory that is hard coded for automatic backup during an unexpected power loss. Alternately, the portion of physical memory used for mapping logical addresses may be an area of non-volatile memory, for example, fast RAM with a supplemental battery backup. One method of accomplishing the memory mapping process may be through a memory device driver (not depicted) that writes preferred, i.e. backed up memory, through the basic input output structure (BIOS).

A main power input 218 supplies power under normal circumstances, while an auxiliary power input 220 may supply power for at least temporary operation when main power 218 is lost. An input 222 from the power loss sensor (e.g. FIG. 2, 108) may be used to indicate an unexpected power loss, triggering subsequent backup activity.

As discussed above, the API 204 may receive information corresponding to persistent data to be preserved in the event of an unexpected power loss. The API 204 may also be used for checking flag status as well as for the actual recovery of the data 212. As indicated above the flags may be used to indicate the occurrence of an unexpected power loss and/or the availability of data 212 for recovery.

The logic unit 202 may implement the API 204. The logic unit 202 may also monitor and respond to signals and messages received via the input/output 206. The logic unit may further have the ability to take control of the address, data and control lines associated with the volatile memory 114 (FIG. 3) and special memory 118 (FIG. 3) for transfer of the data to be preserved, as indicated by the instructions received via the API 204. The logic unit may further include cryptographic resources (not depicted) for encrypting data when so requested by a data owner.

Figure 5:
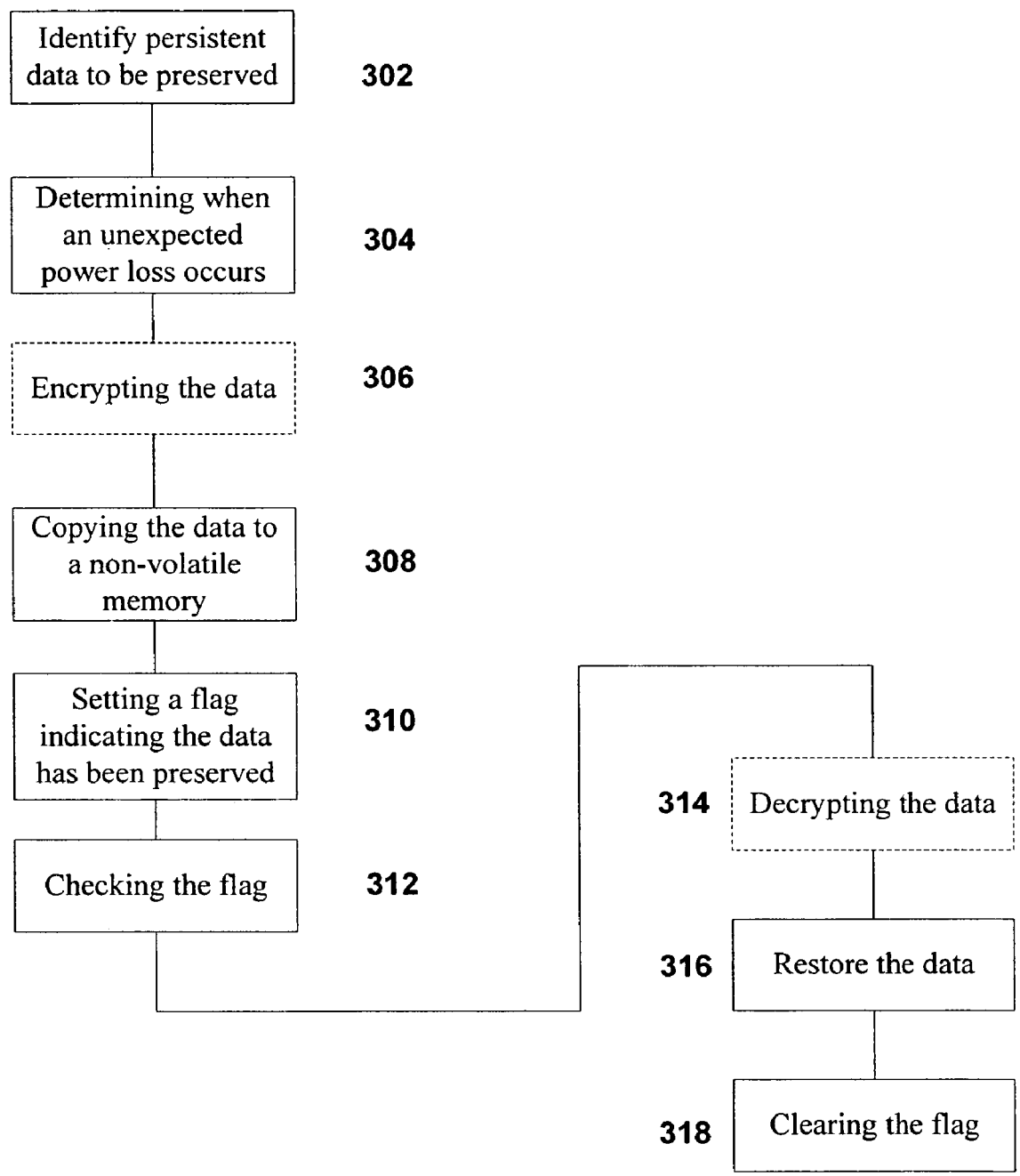
FIG. 5 is a flow chart depicting a method of maintaining persistent data on a computer.

A method for preserving data in a computer when an unexpected power loss occurs is depicted in the flow chart of FIG. 5. The method may be applied to the apparatus described in FIG. 3 or any other appropriate apparatus. An entity running in a computer 100, for example, an application program, operating system, utility, etc., may designate 302 data 136 for preservation in the event of an unexpected power loss. As detailed above, an application program interface 128 may be used to identify the location of data 136, and may use any known method to indicate the data 136, for example, a logical memory range or a structure handle, etc. Alternately, a memory controller, such as exemplary controller 200 of FIG. 4, may maintain mapping information for logical memory addresses to physical memory addresses so that the designated data may be located when an unexpected power loss occurs. Additionally, the identification may be in the form of memory locations that map to supported physical memory locations for use by the application may use for storing data.

A determination is made 304 when an unexpected power loss occurs, for example, by monitoring a sensor 108. A flag indicating an unexpected power loss may be set 305. Optionally, based on system or application preferences, the data 136 may be encrypted 306. A memory controller 126 or other hardware or software mechanism, for example, circuit 140 or function 142 may use the location information to copy 308 the data from the location in volatile memory 114 to a non-volatile memory 116 or a special non-volatile memory 118. When the copying 308 the data is complete, a flag may be set 310 indicating data has been preserved as requested by the entity.

Referring to FIG. 6, a power-on cycle of a computer adapted to maintain persistent data is discussed and described. After restoring power 402 and to the computer 100, a boot process or other entity concerned with maintenance of persistent data may check 404 the flag status, for example, by calling an API 128 function for that purpose. When no flags are present indicating the previous shut down was orderly, i.e. not involving an unexpected power loss, the no-flag branch may be taken and a normal boot executed 406. Normal operation 416 follows the normal boot 406.

If, at 404, an unexpected power loss flag only is set, the boot process or other entity may assume that an unexpected power loss occurred, but no data was saved. The "UPL only" branch from 404 may be taken to 408. The boot process or other entity may take alternate measures at 408 to recover any data that may be available, such as checking for auto-backup data on a hard disk. After performing whatever boot recovery is available, i.e. a partial recovery, the boot process or other entity may clear 414 the unexpected power loss flag and normal operation 416 proceeds.

When both flags are found 404 to be set, indicating that an unexpected power loss occurred and that data is available for recovery, the entity may request the data via the API 128. If encrypted, the data 136 may be decrypted 410. The data 136 may then be restored 412 to the application or, if appropriate, to the original location in volatile memory 114. When the restoration is complete, the flags indicating unexpected power loss and data availability may be cleared 414. Clearing the flags 414 may be an atomic operation with restoring the data 412 to avoid confusion in subsequent operation of the computer 100, should a subsequent unexpected loss of power occur.

The invention claimed is:

1. A method of preserving a data in a computer when a power loss occurs comprising:
    designating a range of system memory containing the data to be preserved in the event of the power loss by an application program via a software application program interface;
    determining when the power loss has occurred;
    copying the data to a non-volatile memory responsive to determining that the power loss has occurred; and
    receiving an AddMemoryObj([in]MemoryRange) call via the software application program interface.

2. The method of claim 1, further comprising retrieving the data when the power loss is ended.

3. The method of claim 2, wherein the retrieving the data further comprises retrieving the data using the application program interface.

4. The method of claim 1, further comprising setting a flag when the power loss has occurred and clearing the flag when the data has been retrieved, the flag comprising one of an indication of the power loss and an indication of successful copying the data to the non-volatile memory.

5. The method of claim 1, wherein copying the data to a non-volatile memory further comprises copying the data to a non-volatile memory after a main processor has been disabled due to the power loss.

6. The method of claim 1, wherein the designating the data to be preserved comprises designating at least one pre-determined memory location.

7. A computer adapted for preserving data upon a power loss comprising:
    a main power supply for receiving a line power and supplying energy to the computer;
    a first memory comprising a first data, the first data being a range of system memory;
    a non-volatile memory;
    a memory controller coupled to the first memory and the non-volatile memory for storing the first data in the non-volatile memory responsive to the signal, the memory controller supporting a software application program interface for receiving a designation of the first data, the software application program interface supporting an AddMemoryObj([in]MemoryRange) call;

a sensor coupled to the main power supply and the memory controller, the sensor for sending a signal when the line power to the main power supply is interrupted; and a supplemental power source, the supplemental power source providing energy, at least temporarily, to one of the first memory, the non-volatile memory and the memory controller when the line power to the main power supply is interrupted.

8. The computer of claim 7, wherein the first data occupies less than 10% of the first memory.

9. The computer of claim 7, further comprising:

a second memory for storing a second data, the second data comprising information about the first data.

10. The computer of claim 9 wherein the second memory is comprised by one of the memory controller, the first memory, and the non-volatile memory.

11. The computer of claim 9, further comprising an application program interface for programming the second data, the second data for determining a location of the first data.

12. The computer of claim 7, further comprising:

a processor coupled to the supplemental power source, the processor implementing the memory controller.

13. A memory controller for use in a computer adapted for preserving data upon a power loss, the memory controller comprising:

a logic unit;

a first input for receiving a signal indicative of the power loss;

a second input for receiving supplemental power during the power loss;

an application program interface for configuring an information corresponding to a first data to be preserved upon the power loss, the application program interface supporting receipt of an AddMemoryObj([in]MemoryRange) call designating a range of system memory as the data for preserving during a power loss; and a memory for storing the information.

14. The memory controller of claim 13 wherein the logic unit provides the application program interface.

15. The memory controller of claim 13 wherein the information corresponding to the first data is a range of memory comprising the first data.

16. The memory controller of claim 13 wherein the logic unit, responsive to receiving the signal, uses the information corresponding to the first data to store a copy of the first data in a non-volatile memory.

17. The memory controller of claim 16 wherein the logic unit, responsive to receiving the signal, uses the information corresponding to the first data to store an encrypted copy of the first data in the non-volatile memory.

18. The memory controller of claim 13 wherein the memory further comprises a location wherein the logic unit sets a flag at the location indicating when the first data has been preserved.

19. The memory controller of claim 18 wherein the application program interface further comprises a routine for determining when the flag is set and for recovering the first data from the non-volatile memory.

\* \* \* \* \*